United States Patent
Akamatsu (10) Patent No.: US 7,240,276 B2
(45) Date of Patent: Jul. 3, 2007

(54) METHOD AND APPARATUS FOR TURBO CODING AND DECODING IN A DISK DRIVE

(75) Inventor: Manabu Akamatsu, Ome (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 553 days.

(21) Appl. No.: 10/674,424

(22) Filed: Oct. 1, 2003

(65) Prior Publication Data

US 2004/0061964 A1    Apr. 1, 2004

(30) Foreign Application Priority Data

Oct. 1, 2002 (JP) .............................. 2002-288908

(51) Int. Cl.
*H03M 13/00* (2006.01)

(52) U.S. Cl. .................................... 714/788

(58) Field of Classification Search ................ 714/755, 714/788
See application file for complete search history.

(56) References Cited

U.S. PATENT DOCUMENTS

| | | | | |
|---|---|---|---|---|
| 4,922,437 | A | 5/1990 | Sakata et al. .................. 710/57 |
| 5,243,471 | A | 9/1993 | Shinn .......................... 360/48 |
| 5,341,249 | A | 8/1994 | Abbott et al. .................. 360/46 |
| 6,014,411 | A | 1/2000 | Wang .......................... 375/259 |
| 6,023,386 | A | 2/2000 | Reed et al. .................... 360/51 |
| 6,023,783 | A | 2/2000 | Divsalar et al. ............. 714/792 |
| 6,038,091 | A | 3/2000 | Reed et al. .................... 360/46 |
| 6,043,946 | A | 3/2000 | Genheimer et al. ........... 360/63 |
| 6,108,388 | A | 8/2000 | Douillard et al. ........... 375/348 |
| 6,249,398 | B1 | 6/2001 | Fisher et al. .................. 360/65 |
| 6,304,985 | B1 | 10/2001 | Sindhushayana et al. ... 714/702 |
| 6,334,197 | B1 | 12/2001 | Eroz et al. .................. 714/701 |
| 6,389,571 | B1 * | 5/2002 | Yang et al. .................. 714/766 |
| 6,757,117 | B1 * | 6/2004 | Livingston ................... 360/25 |
| 6,826,722 | B2 * | 11/2004 | Miyauchi et al. ........... 714/752 |
| 6,986,093 | B2 * | 1/2006 | Itakura ........................ 714/755 |
| 7,031,090 | B2 * | 4/2006 | Ichihara et al. ............... 360/65 |
| 2003/0161062 | A1 | 8/2003 | Akamatsu .................... 714/786 |
| 2003/0174426 | A1 | 9/2003 | Akamatsu .................... 714/786 |
| 2004/0076245 | A1 | 4/2004 | Okamoto et al. ........... 375/341 |

FOREIGN PATENT DOCUMENTS

| JP | 08-306139 | 11/1996 |
|---|---|---|
| JP | 10-255402 | 9/1998 |

(Continued)

OTHER PUBLICATIONS

Hagenauer et al., "A Viterbi Algorithm with Soft-Decision Outputs and its Applications," German Aerospace Research Establishment, Institute for Communications Technology, 1989, pp. 1680-1686.

(Continued)

*Primary Examiner*—Shelly Chase
(74) *Attorney, Agent, or Firm*—Pillsbury Winthrop Shaw Pittman, LLP (57) ABSTRACT

A read channel carrying out turbo coding/iterative decoding is disclosed in a disk drive. The read channel has an iterative decoder including an APP decoder which changes a likelihood equation according to a detection result of a burst noise detection unit so as to correct a burst error and executes APP decoding calculation of an inner code.

8 Claims, 5 Drawing Sheets

FOREIGN PATENT DOCUMENTS

| | | |
|---|---|---|
| JP | 11-185210 | 7/1999 |
| JP | 2000-059236 | 2/2000 |
| JP | 2001-127647 | 5/2001 |
| JP | 2001-211411 | 8/2001 |
| JP | 2001-344903 | 12/2001 |
| JP | 2002-164946 | 6/2002 |
| JP | 3318937 | 6/2002 |
| JP | 2002-198827 | 7/2002 |
| JP | 2004-086994 | 3/2004 |

OTHER PUBLICATIONS

Yeo et al., "VLSI Architectures for Iterative Decoders in Magnetic Recording Channels," IEEE Transactions of Magnetics, vol. 37, No. 2, Mar. 2001, pp. 748-755.

Isaka et al., "A tutorial on "parallel concatenated (Turbo) coding," "Turbo (iterative) decoding" and related topics," The Institute of Electronics, Technical Report of IEICE, 1998, pp. 1-18.

Austrian Patent Office Search and Examination Report issued Jun. 4, 2004.

Japanese Office Action dated Aug. 23, 2005 for Appln. No. 2002-288908.

Wu, "Coding and Iterative Detection for Magnetic Recording Channels," The Kluwer International Series in Engineering and Computer Science, pp. 21-46.

Japanese Office Action dated Jan. 9, 2007 for Appln. No. 2002-288908.

* cited by examiner

METHOD AND APPARATUS FOR TURBO CODING AND DECODING IN A DISK DRIVE

CROSS-REFERENCE TO RELATED APPLICATIONS

This application is based upon and claims the benefit of priority from the prior Japanese Patent Application No. 2002-288908, filed Oct. 1, 2002, the entire contents of which are incorporated herein by reference.

BACKGROUND OF THE INVENTION

1. Field of the Invention

The present invention generally relates to a field of disk drives, particularly relates to a data reproducing technique to which a turbo coding/decoding method is applied.

2. Description of the Related Art

A signal processing circuit designated as a read channel, in which a data signal read out from a disk medium (hereinafter simply referred to as disk) with a head is processed to reproduce original data, is generally used in the field of the disk drive typified by a hard disk drive. Usually the signal processing circuit includes a custom LSI and the signal processing circuit containing a write channel processing a write data signal recorded on the disk is also designated as read/write channel or data channel.

The data decoding method (data reproducing method) designated as the so-called PRML (Partial Response Maximum Likelihood), in which a partial response (PR) method and a Viterbi decoding method are combined, is adopted in the current read/write channel.

In contrast to the PRML method, recently another data decoding method in which the PR method and a turbo coding/iterative decoding method are combined receives attention in the field of the disk drive (see Zining Wu, "Coding and iterative detection for magnetic recording channels" Kluwer Academic Publishers, pp. 21–43, 2000).

By the way, the head having a structure in which a read head element and a write head element are separately mounted on a slider is used in the disk drive. A GMR (Giant Magnetic Resistance) element is usually used as the read head element. The GMR element generates a phenomenon called "thermal asperity" in read operation.

In the disk drive, it is confirmed that the data signal read out from the head includes the so-called burst noise in the read operation due to a factor such as the thermal asperity. Because there is a problem in which the burst noise results in disability of error correction and the like, various kinds of measures have been proposed (see Jpn. Pat. Appln. KOKAI Publication No. 2002-164946).

The data decoding method in which the PR method and the turbo coding/iterative decoding method are combined has a configuration in which plural codes are connected through an interleaver. Sometimes this causes the error to be widely spread by the interleaver, in the case that the data signal includes the burst noise as described above. Accordingly, in the case that the error correction is carried out to the decoded data, there is the problem in which the error correction becomes disabled.

BRIEF SUMMARY OF THE INVENTION

In accordance with one embodiment of the present invention, there is provided a disk drive which has a read channel adopting a data decoding method in which a PR method and a turbo coding/iterative decoding method are combined and improves the error correction performance for burst noise.

The disk drive comprises a head which reads out data from a disk medium and a read channel which decodes a data signal of concatenated turbo codes read out by the head and reproduces original data, wherein the read channel has a detection unit which detects burst noise contained in the data signal and an iterative decoding unit which executes iterative decoding processing including a posteriori probability decoding processing (APP decoding processing) to the data signal, the iterative decoding unit changing contents of likelihood calculation for carrying out the decoding calculation according to the detection result by the detection unit.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

Figure 1:
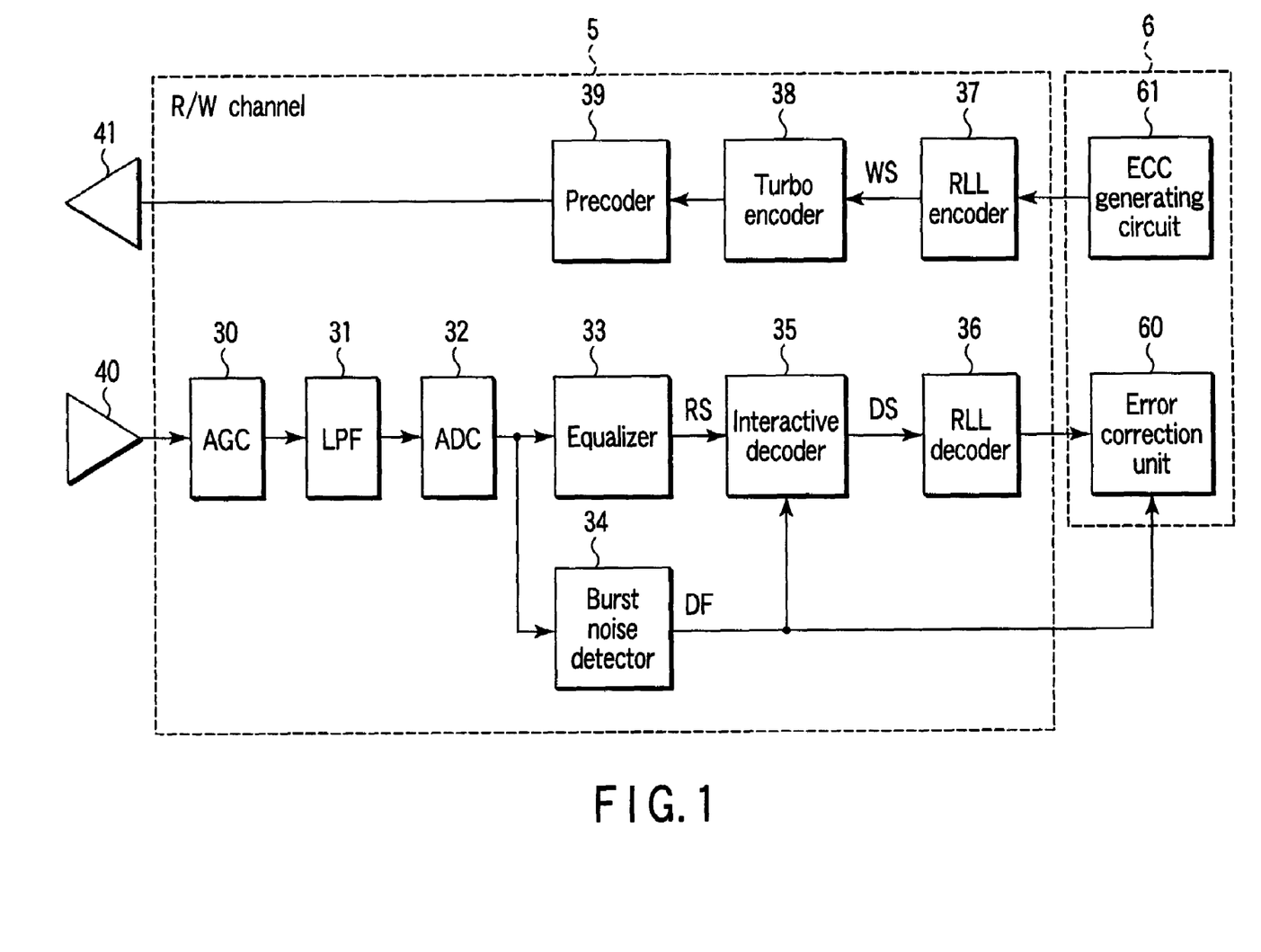
FIG. 1 is a block diagram showing an essential part of a read/write channel according to an embodiment of the invention.
Figure 3:
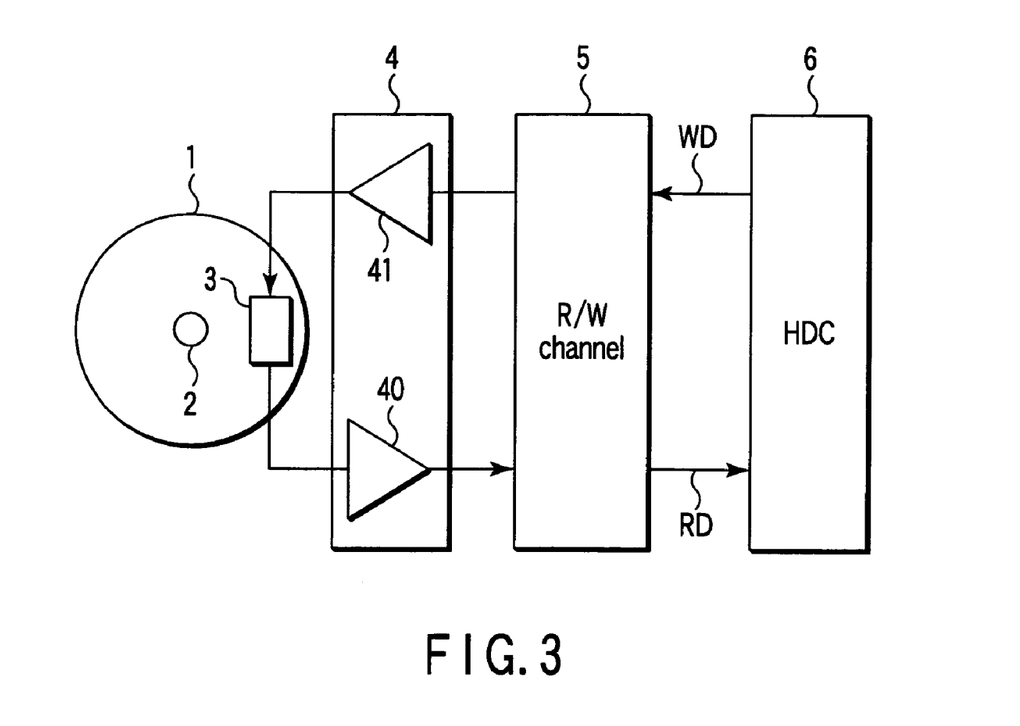
FIG. 3 is a block diagram showing an essential part of a disk drive according to the embodiment.

A preferred embodiment of the invention will be described below referring to the accompanying drawings. FIG. 1 is a block diagram showing an essential part of a read/write channel 5 according to the embodiment. FIG. 3 is a block diagram showing an essential part of a disk drive including the read/write channel 5.

(Configuration of Disk Drive)

As shown in FIG. 3, the disk drive has a disk 1 which is a recording medium, a head 3, a preamplifier circuit 4, the read/write channel 5, and a disk controller (HDC) 6.

A spindle motor (SPM) 2 rotates the disk 1. The head 3 includes a read head element (GMR element) and a write head element, the read head element reads out data from the disk 1. In the head 3, the write head element writes the data on the disk 1.

The preamplifier circuit 4 has a read amplifier 40 which amplifies a data signal (read data signal) read out by the read head element to transmit it to the read write channel 5. The preamplifier circuit 4 also has a write amplifier 41 which converts the write data signal outputted from the read/write channel 5 into write current to supply it to the write head element.

HDC 6 includes a host interface connecting the disk drive and a host system and carries out input/output of the write data WD and the read data (reproducing data) RD between the read/write channel 5 and the HDC 6. As shown in FIG. 1, the HDC 6 has an error correction unit 60 connected to the read channel of the read/write channel 5 and an error correction code (ECC) generating circuit (an ECC generator) 61 connected to the write channel.

(Read/Write Channel)

As shown in FIG. 1, the read/write channel 5 is broadly divided into the read channel connected to the read amplifier 40 and the write channel connected to the write amplifier 41.

The write channel has an RLL (Run Length Limited) encoder 37, a turbo encoder 38, and a precoder 39. The RLL encoder 37 converts the write data WD into a normal RLL code sequence (WS). ECC data is added to the write data by the ECC generator 61. The precoder 39 is provided in order to give recursive characteristics to a PR channel in the read channel. At this point, the PR channel is one in which the input of the read amplifier 40 to the output of the equalizer 33 have desired PR (Partial Response) characteristics. The PR channel is regarded as a kind of convolutional codes and corresponds to an inner code in concatenated turbo codes.

Figure 4:
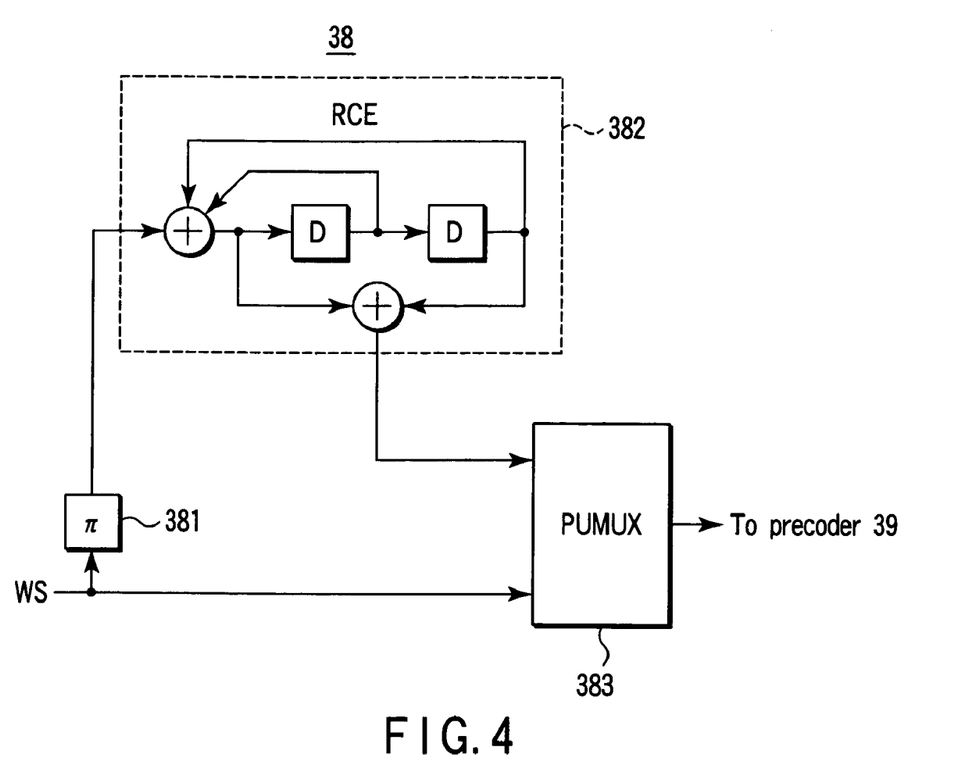
FIG. 4 is a block diagram showing an essential part of a turbo encoder according to the embodiment.

As shown in FIG. 4, the turbo encoder 38 includes an interleaver 381 connected to the RLL encoder 37, an RC encoder (RCE: Recursive Convolutional Encoder) 382, and a PUMUX 383. The PUMUX 383 is a puncturing-multiplexing circuit combining a puncturing circuit and a multiplexer. The PUMUX 383 is connected to the RLL encoder 37 and the RC encoder 382.

The RC encoder 382 includes a delay element (D) and a mod 2 adder (EXCLUSIVE-OR gate "+"), carries out RSC (Recursive Systematic Convolutional) coding operation, and outputs a parity sequence. In the concatenated turbo codes, the RSC code corresponds to an outer code relative to the inner code which is the PR channel code.

The turbo encoder 38 randomizes the RLL code sequence (WS) with the interleaver 381 and outputs it to the RC encoder 382. It is assumed that the RC encoder is in the case that, e.g. constraint length L of the code is "L=3". At this point, the following equations (1) and (2) hold when output for input $U_k$ is set to $P_k$.

$$Z_k = U_k + Z_{k-1} + Z_{k-2} \quad (1)$$

$$P_k = Z_k + Z_{k-2} \quad (2)$$

Where $Z_k$ means an inner variable of the RC encoder 382 and + means EXCLUSIVE-OR operation.

The PUMUX 383 inputs the information sequence (RLL code sequence (WS)) and the parity sequence and carries out the multiplexing processing while the PUMUX 383 punctures the parity sequence so as to become a desired coding ratio.

The write channel transmits a write coding data sequence to the write amplifier 41 after carrying out predetermined inversion processing to a systematic coding sequence from PUMUX 383 by the precoder 39. The write channel usually includes a compensator carrying out write compensation. The write head element included in the head 3 records the write data signal which is turbo-coded on the disk 1 by the write current supplied from the write amplifier 41.

(Read Channel)

As shown in FIG. 1, the read channel has an AGC circuit 30 connected to the preamplifier 40, a low-pass filter (LPF) 31, an A/D converter 32, and an equalizer 33.

The AGC circuit 30 includes VGA (Variable Gain Amplifier) and controls signal amplitude of the read signal from the read amplifier 40 at a constant value. The LPF 31 removes high-frequency noise from the data signal. The A/D converter 32 converts an analog data signal into a digital signal. The equalizer 33 usually includes an FIR (Finite Impulse Response) type of digital filter and carries out waveform equalizing processing in the PR method.

The read channel further includes a burst noise detector 34 connected to the A/D converter 32, an iterative decoder 35, and an RLL encoder 36.

The burst noise detector 34 detects the burst noise such as the thermal asperity and dropout according to an amplitude value of the data signal (digital signal) outputted from the A/D converter 32. The burst noise detector 34 outputs detection flag information DF (0/1) as the detection result to the iterative decoder 35. At this point, the detection flag information DF "1" means the detection of the burst noise.

Figure 2:
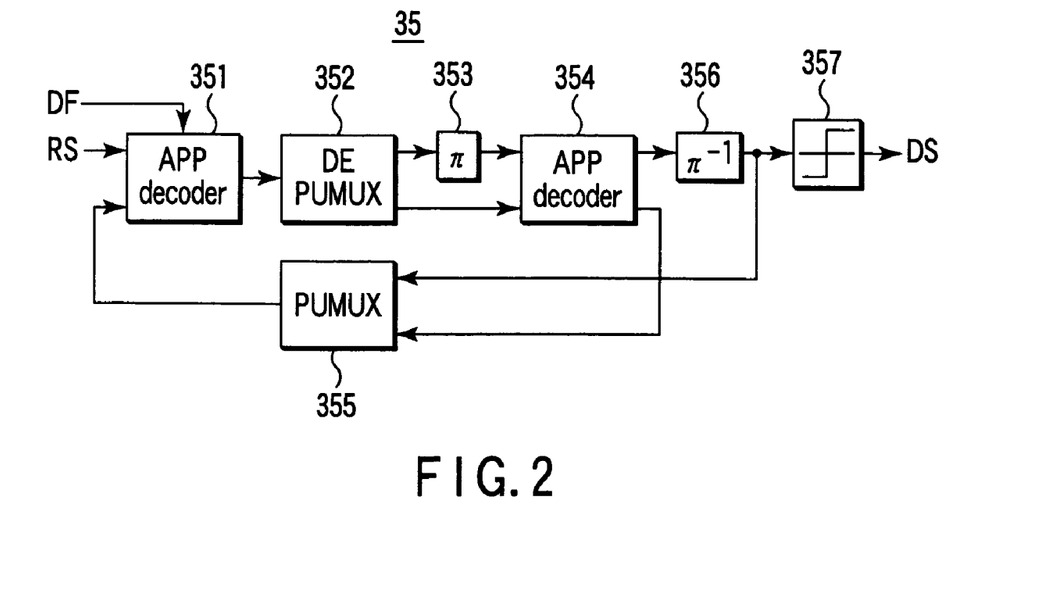
FIG. 2 is a block diagram showing an essential part of an iterative decoder according to the embodiment.

As shown in FIG. 2, the iterative decoder 35 has an APP decoder 351 carrying out APP (A Posteriorieriori Probability) decoding processing to the PR channel (inner code), a DEPUMUX 352, an interleaver 353, an APP decoder 354 carrying out the APP decoding processing to the RSC sequence (outer code), a PUMUX 355 for use in the iterative decoding processing, a deinterleaver 356, and a hard decision unit 357.

The APP decoder 351 inputs the detection flag information DF from the burst noise detector 34, and output RS of the equalizer 33, and output of the PUMUX 355. The DEPUMUX 352 is a circuit in which a depunturing circuit and a demultiplexing circuit are combined. The DEPUMUX 352 carries out the inversion processing of the PUMUX 383. The deinterleaver 356 carries out the inversion processing of the interleaver 353. The hard decision unit 357 carries out binary (0/1) decision to the APP decoding result and determines the final turbo decoding sequence.

The RLL encoder 36 carries out the RLL decoding processing to the turbo decoding sequence determined (decoded) by the hard decision unit 357 and outputs a reproducing data sequence (RD) corresponding to the original data to the HDC 6.

In the HDC 6, the error correction unit 60 carries out the error correction processing to the reproducing data RD transmitted from the read channel. According to the detection flag information DF from the burst noise detector 34, the error correction unit 60 carries out erasure correction processing by using the flag information (DF=1) as an erasure pointer.

(Data Decoding Operation)

Figure 5:
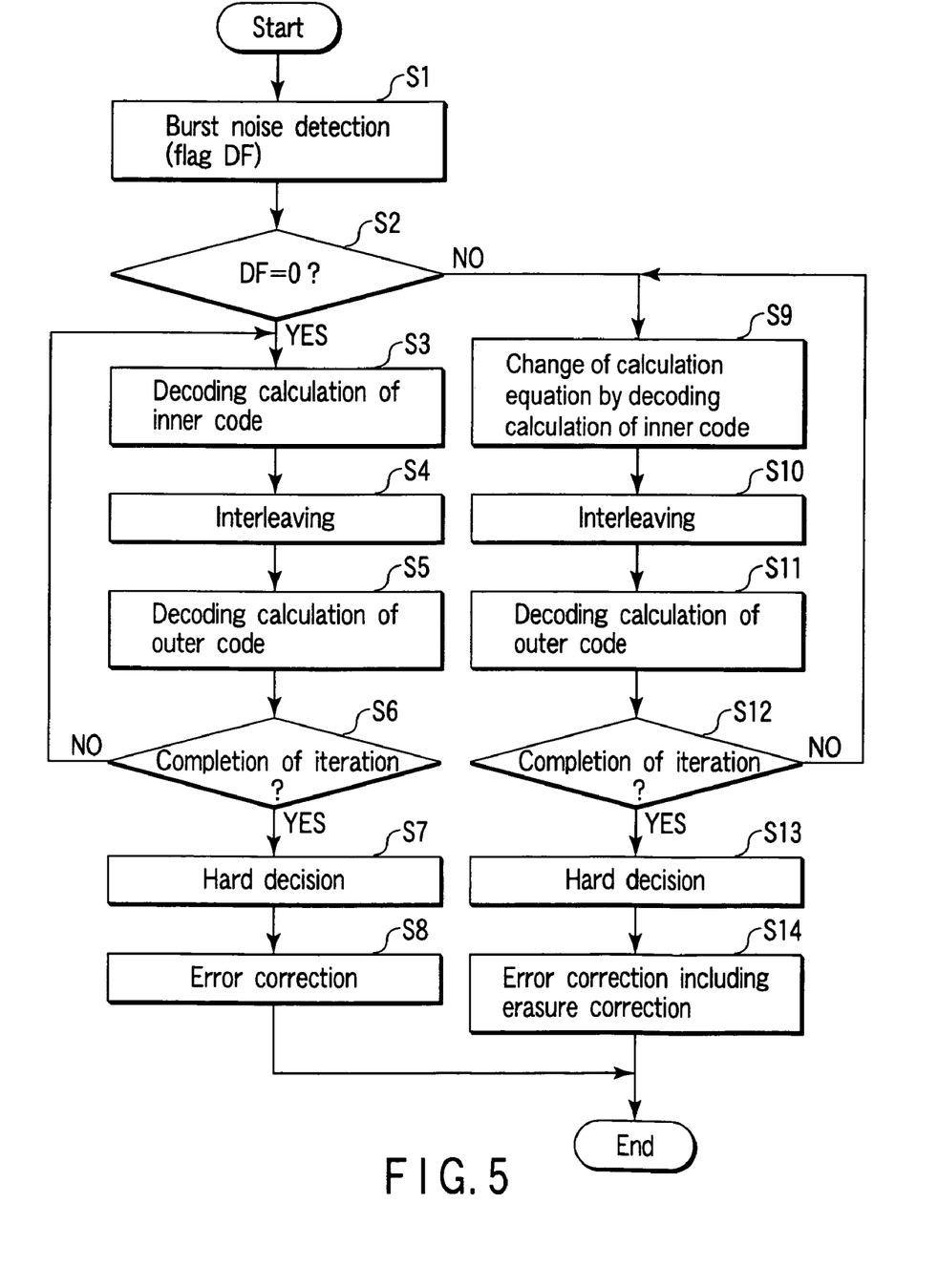
FIG. 5 is a flow chart for explaining operation of the iterative decoder according to the embodiment.

Referring to the flowchart of FIG. 5 with FIG. 1, data decoding operation which is primarily the decoding operation in the iterative decoder 35 will be described.

When the data signal recorded on the disk 1 is read out by the read head element of the head 3, the data signal is amplified by the read amplifier 40 and transmitted to the read channel of the read/write channel 5. In the read channel, the data signal is transmitted to the iterative decoder 35 through the AGC circuit 30, LPF 31, the A/D converter 32, and the equalizer 33.

When the burst noise detector 34 detects the burst noise contained in the data signal outputted from the A/D converter 32, the burst noise detector 34 outputs the detection flag information (DF=1) to the iterative decoder 35 (STEP S1).

In the iterative decoder 35, as shown in FIG. 2, the APP decoder 351 carries out the APP decoding processing, in which the PR channel is set to the inner code, to the data sequence RS which is the output of the equalizer 33.

Figure 6:
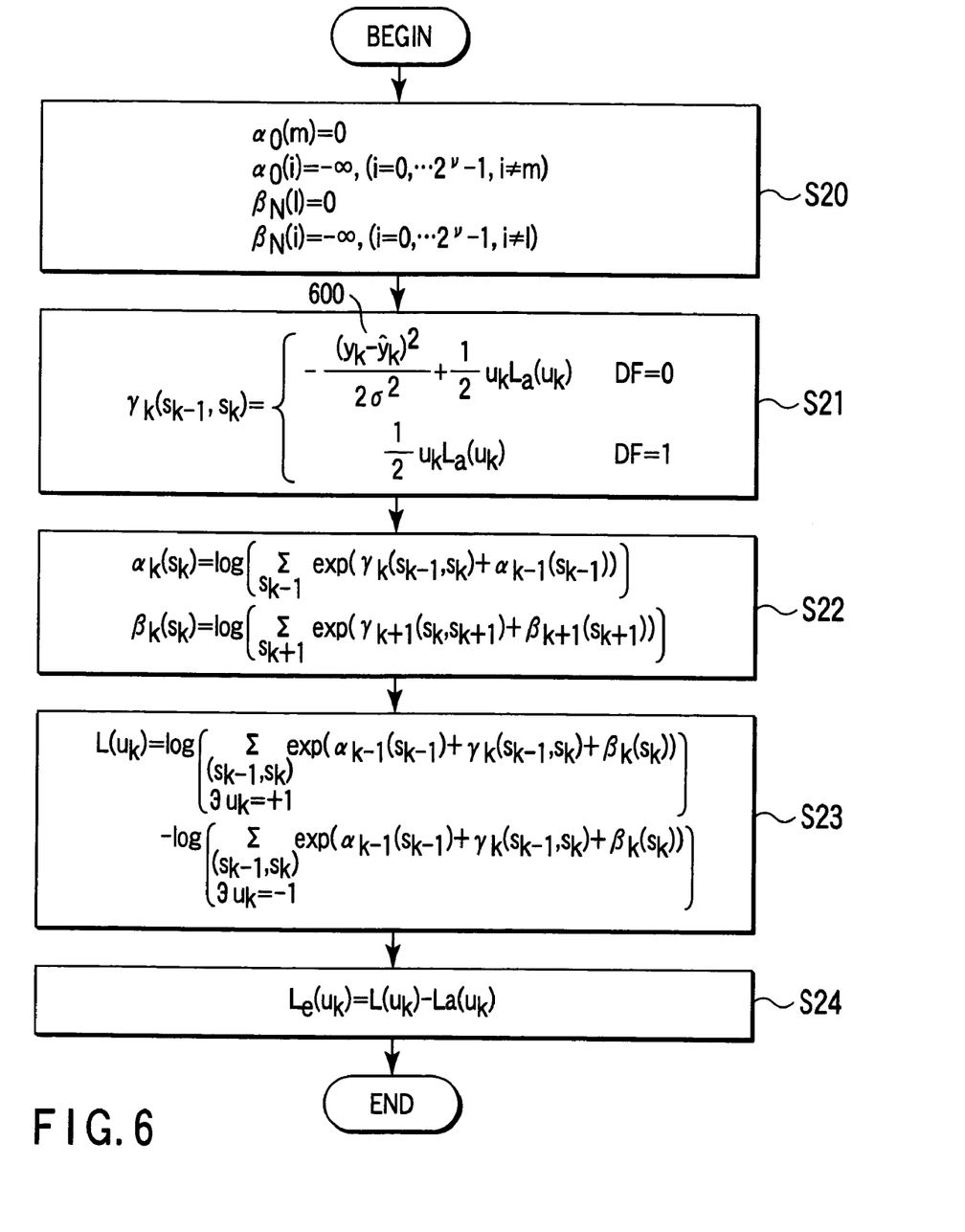
FIG. 6 is a flow chart showing an example of an APP decoding algorithm for use in the iterative decoder according to the embodiment.

Specifically the APP decoder 351 carries out processing by, e.g. a BCJR algorithm (see the above-described reference by Zining Wu) shown in FIG. 6 as the APP decoding processing and calculates a logarithmic external information probability ratio (STEP S3). However, the logarithmic external information probability ratio is set to zero at first time of the iterative coding processing. In this case, the case in which the burst noise is not detected from the burst noise detector 34 (DF=0) is assumed (YES in STEP S2).

The DEPUMUX 352 is a circuit in which a depuncturing circuit and a demultiplexer are combined. The DEPUMUX 352 carries out the inversion processing of PUMUX 383 in the turbo encoder 38 and outputs the logarithmic external information probability ratio to the information sequence and an external information probability ratio to the parity sequence. However, the external information probability ratio corresponding to a position punctured by PUMUX 383.

Then, the interleaver 353 carries out interleaving by the same way for the interleaver 381 in the turbo encoder 38 and outputs the logarithmic external information probability ratio to the interleaved information sequence and an external information probability ratio to the parity sequence (STEP S4).

For the output of the interleaver 353, the APP decoder 354 carries out the APP decoding processing to the recursive convolutional code which is the outer code (STEP S5). The deinterleaver 356 carries out the inversion processing of the interleaver 353 and outputs the logarithmic external information probability ratio corresponding to the original information sequence.

The PUMUX 355 inputs the logarithmic external information probability ratio corresponding to the parity sequence outputted from the APP decoder 354 and the logarithmic external information probability ratio corresponding to the original information sequence outputted from the deinterleaver 356 and carries out the puncturing and multiplexing processing. The PUMUX 355 outputs the processing result as a priori information probability ratio to the inner code to the APP decoder 351. The APP decoder 351 inputs the priori information probability ratio and the output from the equalizer 33 and iterates the APP decoding processing (STEP S6).

When the iterative decoding processing is completed, the hard decision unit 357 carries out hard decision processing, in which zero is set to a threshold for the logarithmic external information probability ratio to the original information sequence outputted from the deinterleaver 356, and determines the final decoding sequence (0/1) corresponding to the original information sequence to output it (YES in STEP S6 and STEP S7).

Further, the RLL encoder 36 carries out the RLL decoding processing to the turbo decoding sequence decoded with the hard decision unit 357 and outputs the reproducing data sequence (RD) corresponding to the original data to HDC 6. The error correction unit 60 carries out the error correction processing to the reproducing data RD transmitted from the read channel (STEP S8).

On the other hand, in the case that the burst noise is detected from the burst noise detector 34 (DF=1), the APP decoder 351 changes a likelihood equation and carries out the APP decoding processing of the inner code (NO in STEP S2 and STEP S9).

For the case in which the APP decoder changes the likelihood equation according to the detection flag DF and carries out the APP decoding processing, a specific example in the case that the BCJR algorithm is carried out will be described below referring to the flow charts of FIGS. 5 and 6. In FIG. 5, the description of procedures from STEP S10 to STEP S13 is omitted because the procedures are the same as the procedures from STEP S4 to STEP S7.

As shown in FIG. 6, the BCJR algorithm for executing the APP decoding processing to the PR channel usually includes the procedures from STEP S20 to STEP S24.

At this point, $\alpha(S_k)$, $\beta(S_k)$, $\gamma(S_{k-1}, S_k)$, $Y_k$ $La(U_k)$, $L(U_k)$, and $Le(U_k)$ mean a normal direction state probability in a state $(S_k)$, a reverse direction state probability in the state $(S_k)$, a probability of a path changing from a state $(S_{k-1})$ to the state $(S_k)$, the output (RS) of the equalizer 33, a logarithmic priori information probability ratio, a logarithmic likelihood ratio, and the logarithmic external information probability ratio, respectively.

The BCJR algorithm includes STEP S20 initializing $\alpha(S_k)$ and $\gamma(S_k)$ and STEP S21 calculating $\gamma(S_{k-1}, S_k)$ from $Y_k$ and $La(U_k)$. The BCJR algorithm further includes STEP S22 recursively calculating $\alpha(S_k)$ and $\beta(S_k)$ from $\gamma(S_{k-1}, S_k)$, STEP S23 calculating $L(U_k)$ from $\alpha(S_k)$, $\beta(S_k)$ and $\gamma(S_{k-1}, S_k)$, and STEP S24 calculating $Le(U_k)$ from $La(U_k)$ and $L(U_k)$.

In the above-described BCJR algorithm, as shown in STEP S21, the likelihood equation calculating $\gamma(S_{k-1}, S_k)$ is changed according to the detection flag (DF0/1) of the burst noise. That is to say, in the case that the burst noise is detected (DF=1), a calculation term 600 for calculating a channel value which is the output (RS) of the equalizer 33 is erased and the likelihood calculation for calculating the probability of the path used with the logarithmic priori information probability ratio ($La(U_k)$) is carried out. The likelihood calculation corresponds to a branch-metric calculation in normal Viterbi decoding processing.

Accordingly, when the burst noise is contained in the output (RS) of the equalizer 33, an error element caused by the burst noise can be erased from the likelihood calculation result in order to erase the calculation term 600 for calculating the channel value. As described above, since the calculation result of the APP decoder 351 is randomized by the interleaver 353, the burst error is diffused when the burst noise is present.

In the embodiment, the calculation term 600 of the equation calculating the channel value in the APP decoding calculation which is presumed that the burst error is contained can be erased according to the detection of the burst noise. Therefore, the diffusion of the burst error can be prevented and the error can be localized.

In the embodiment, in the case where the burst noise is detected from the burst noise detector 34 (DF=1), the error correction unit 60 carries out erasure correction processing by using the detection flag information DF (DF=1) as the erasure pointer (STEP S14). Accordingly, in the HDC 6, the localized error can be corrected to the reproducing data decoded with the read channel.

In short, in the embodiment, the dispersion (diffusion) of the burst error can be prevented in the pre-step (interleaver) of the APP decoding processing of the outer code by the APP decoding processing for changing the likelihood equation according to the detection flag (DF) of the burst noise. Further, in the error correction unit 60, the localized error can be corrected by executing the erasure correction using the detection flag (DF) as the erasure pointer.

Though the specific example using the BCJR algorithm was described as the decoding processing of the APP decoder 351 in the embodiment, the invention is not limited to the embodiment. For example, the invention can be also applied to other APP decoding algorithms such as Max-Log-MAP and SOVA as an alternating method of the BCJR algorithm.

Though the concatenated turbo code method for concatenating the recursive convolutional code was assumed as the outer code in the read/write channel of the embodiment, the invention is not limited to the embodiment. The invention can be also applied to a concatenating code method for concatenating a low-density parity detection code, a parity detection code, or the like as the outer code.

As described above, according to the embodiment, in the disk drive adopting the data decoding method in which the PR method and the turbo coding/iterative decoding method are combined, particularly the error correction performance against the burst noise can be improved, as a result, good error rate characteristics can be realized.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A disk drive comprising:
a head which reads out data from a disk medium; and
a read channel which decodes a data signal of concatenated turbo codes read out by the head and reproduces original data,
wherein the read channel has:
a detection unit which detects burst noise contained in the data signal; and
an iterative decoding unit which executes iterative decoding processing including a posteriori probability decoding processing (APP decoding processing) to the data signal, the iterative decoding unit changing contents of likelihood calculation for carrying out the decoding calculation when the burst noise is detected by the detection unit, wherein a calculation term for calculating a channel value is erased from the likelihood calculation.

2. The disk drive according to claim 1, further comprising an error correction unit which executes error correction processing to data reproduced by the read channel, the error correction unit executing the error correction processing including erasure correction according to the detection result by the detection unit.

3. The disk drive according to claim 1, wherein the iterative decoding unit executes the APP decoding processing of an inner code to the data signal of the concatenated turbo code using a recursive convolutional code as an outer code and includes: a first APP decoding unit which changes the contents of the likelihood calculation according to the detection result by the detection unit; and a second APP decoding unit which executes the APP decoding processing of the outer code.

4. A read channel for decoding a data signal of a concatenated turbo code in a disk drive having a head reading out the data signal from a disk medium, comprising:
a detection unit which detects burst noise contained in the data signal read out by the head; and
an iterative decoding unit which executes iterative decoding processing including a posteriori probability decoding processing (APP decoding processing) to the data signal, the iterative decoding unit changing contents of likelihood calculation for carrying out the decoding calculation when the burst noise is detected by the detection unit, wherein a calculation term for calculating a channel value is erased from the likelihood calculation.

5. The read channel according to claim 4, further comprising: an A/D converter which converts the data signal read out by the head into a digital signal and an equalizer which executes waveform equalizing processing by a partial response method to the digital signal, wherein
the detection unit detects the burst noise on the basis of an amplitude value of the digital signal outputted from the A/D converter, and
the iterative decoding unit executes iterative decoding processing to the data signal outputted from the equalizer, the channel value being an output of the equalizer.

6. The read channel according to claim 4, wherein the iterative decoding unit executes the APP decoding processing of an inner code to the data signal of the concatenated turbo code using a recursive convolutional code as an outer code and includes: a first APP decoding unit which changes the contents of the likelihood calculation according to the detection result by the detection unit and a second APP decoding unit which executes the APP decoding processing of the outer code.

7. A method of decoding a data signal of a concatenated turbo code in a disk drive having a head reading out the data signal from a disk medium, comprising:
detecting burst noise contained in the data signal read out by the head; and
when iterative decoding including a posteriori probability decoding processing (APP decoding processing) is executed to the data signal, changing contents of likelihood calculation for carrying out calculation of the iterative decoding when the burst noise is detected by the detecting, wherein a calculation term for calculating a channel value is erased from the likelihood calculation.

8. A method according to claim 7, wherein the iterative decoding includes, when the APP decoding of an inner code is executed to the data signal of the concatenated turbo code using a recursive convolutional code as an outer code, first APP decoding for changing the contents of the likelihood calculation according to the detection result by the detecting and second APP decoding for executing the APP decoding processing of the outer code.

* * * * *